US007588614B2

(12) United States Patent
Morse et al.

(10) Patent No.: US 7,588,614 B2
(45) Date of Patent: *Sep. 15, 2009

(54) FILTER HOUSING ASSEMBLY

(75) Inventors: Thomas C. Morse, Greenville, NC (US); Mark Huza, Winterville, NC (US); Sean O'Reilly, Morristown, NJ (US)

(73) Assignee: Camfil Farr, Inc., Riverdale, NJ (US)

( * ) Notice: Subject to any disclaimer, the term of this patent is extended or adjusted under 35 U.S.C. 154(b) by 295 days.

This patent is subject to a terminal disclaimer.

(21) Appl. No.: 11/682,580

(22) Filed: Mar. 6, 2007

(65) Prior Publication Data

US 2008/0216457 A1 Sep. 11, 2008

Related U.S. Application Data

(63) Continuation of application No. 10/863,629, filed on Jun. 8, 2004, now Pat. No. 7,220,291.

(51) Int. Cl.
*B01D 46/00* (2006.01)

(52) U.S. Cl. .......................... 55/385.2; 55/420; 55/483

(58) Field of Classification Search .............. 55/502, 55/385.2, DIG. 31, 420, 418, 483; 210/435, 210/450; 74/424.8
See application file for complete search history.

(56) References Cited

U.S. PATENT DOCUMENTS

| 3,638,674 A | 2/1972 | Forst et al. |
| 3,819,209 A | 6/1974 | Anderson et al. |
| 4,000,663 A | 1/1977 | Tyler |
| 4,088,463 A | 5/1978 | Smith |
| 4,371,386 A | 2/1983 | DeVecchi |
| 4,515,007 A * | 5/1985 | Herman .................... 73/38 |
| 4,549,472 A | 10/1985 | Endo et al. |
| 4,834,282 A * | 5/1989 | Tenorio et al. ............ 236/1 G |
| 6,117,202 A | 9/2000 | Wetzel |
| 6,227,962 B1 | 5/2001 | Orendorff |
| 6,468,322 B1 | 10/2002 | Alvin et al. |

(Continued)

FOREIGN PATENT DOCUMENTS

CH  642159  3/1984

(Continued)

OTHER PUBLICATIONS

PCT International Search Report for PCT/US2005/008249: Jun. 22, 2005; pp. 1-2.

(Continued)

*Primary Examiner*—Duane Smith
*Assistant Examiner*—Ives Wu
(74) *Attorney, Agent, or Firm*—Patterson & Sheridan, LLP; Keith P. Taboada (57) ABSTRACT

A filter housing assembly having a gas-tight seal and a method of replacing a filter are generally provided. In one embodiment, the filter housing assembly includes a housing having an opening adapted to receive a filter and an inlet. A seal member is coupled to the housing and is moveable between a first position and at least a second position, the second position sealing the inlet. The filter housing assembly may be configured to retain a roomside replaceable filter or have a filter permanently adhered within the opening.

20 Claims, 8 Drawing Sheets

U.S. PATENT DOCUMENTS

| | | | |
|---|---|---|---|
| 6,770,108 B2 | 8/2004 | Cherry, Sr. | |
| 6,936,084 B2 | 8/2005 | Schlensker et al. | |
| 6,984,331 B2 | 1/2006 | Halstead et al. | |
| 7,220,291 B2 * | 5/2007 | Morse et al. | 55/502 |

FOREIGN PATENT DOCUMENTS

| | | |
|---|---|---|
| CH | 642159 A5 | 3/1984 |
| JP | 2001-119845 A | 4/2001 |
| JP | 2001119845 A | 4/2001 |

OTHER PUBLICATIONS

"Isolation Dampers, Rectangular Bubble-Tight" Product Bulletin 3440S-0103, Camfil Farr, Date Unknown.

"Isolation Dampers, Round" Product Bulletin 3440R-0103, Camfill Farr, Date Unknown.

"Pharmaseal" Product Sheet 3420-0303, Camfill Farr, Date Unknown.

PCT Report for International Application No. PCT/US2005/008249; Filing Date Mar. 11, 2005; dated Dec. 29, 2005.

Translation of First Office Action for Application No. CN2005800017586; Oct. 10, 2008; consisting of ten (10) pages.

Camfil Farr Product Bulletin; "Isolation Dampers Rectangular Bubble-Tight" consisting of five (5) pages.

Camfil Farr Product Bulletin; "Isolation Dampers Round"; consisting of five (5) pages.

Camfil Farr Product Sheet; "Pharmaseal" consisting of nine (9) pages.

* cited by examiner

FILTER HOUSING ASSEMBLY

CROSS-REFERENCE TO RELATED APPLICATIONS

This application is a continuation of U.S. patent application Ser. No. 10/863,629 filed Jun. 8, 2004 now U.S. Pat. No. 7,220,291 by Morse, et al. which is hereby incorporated by reference in its entirety.

BACKGROUND OF THE DISCLOSURE

1. Field of the Invention

The embodiments of the present invention relate generally to a filter housing assembly.

2. Background of the Invention

Cleanrooms are utilized in many industries for contamination control and to improve product yields. A plurality of filters, typically mounted in the ceiling of the cleanroom, are configured to remove particulate from air entering the cleanroom at a predetermined efficiency selected based upon the cleanliness requirements of the activities performed in the cleanroom. As particulates load the filtration media disposed in the filter, the airflow through the filter decreases as the pressure drop across the filter increases. Once the filter reaches a critical pressure drop, the filter is typically replaced.

On other applications, replacement of filters is scheduled based on time or processes performed within the cleanroom. For example, in many pharmaceutical and biotech cleanrooms, periodic replacement of filters is required to meet regulatory or owner specifications. To facilitate efficient replacement of the filter, a hood (housing) is typically mounted in the cleanroom ceiling in which the filter may be readily removed and replaced.

Ducted supply hoods with roomside replaceable filters are commonly used in pharmaceutical applications for cleaning supply air to cleanroom manufacturing and process areas, as well as to laboratory areas. Most of these hoods are supplied with adjustable dampers that allow customers to regulate the airflow without having to remove the filter from the hood. The most common types of dampers are guillotine, opposed blade and butterfly types. When completely closed, these dampers essentially stop the flow of air to the hood. In many cases, the leakage through a closed damper is negligible in terms of flow rate, but is significant when considered in the terms of contamination of a cleanroom.

Because these types of dampers do not provide a seal (i.e., are not leak-free or bubble-tight), they are inadequate when it comes to decontamination processes that require complete isolation of the cleanroom. For example, during routine testing and validation of filters installed in a pharmaceutical facility, one or more filters may be found damaged, leaking and/or requiring replacement. When a technician removes that filter from the hood, the "seal" between the cleanroom and the contaminated plenum and supply ducts upstream of the removed filter is broken. When the new filter is installed, the "seal" between those two areas is restored, but the cleanroom has already been contaminated by air and particulate entering the cleanroom from the contaminated area of the plenum and supply ducts. Thus, the facility owner must perform a decontamination process of the entire room before resuming cleanroom operations. This is a very time-consuming and costly process.

Therefore, there is a need for a filter housing assembly having improved sealing capabilities.

SUMMARY OF THE INVENTION

A filter housing assembly having a gas-tight seal is provided. In one embodiment, the filter housing assembly includes a housing having an opening adapted to receive a filter. An inlet is formed through the housing. A seal member is coupled to the housing and is moveable between a first position and at least a second position, the second position sealing the inlet.

In alternate embodiments, the filter housing assembly may be configured to retain a roomside replaceable filter or a filter permanently adhered to the housing. The filter housing assembly may be utilized to supply and/or exhaust air from a work space, such as a cleanroom. In various embodiments, the seal member may be configured as a butterfly damper or guillotine damper, among others.

In another embodiment, a filter housing assembly is provided that includes a housing having a damper disposed therein. The housing is configured to accommodate a replaceable filter. The damper is selectively positionable to engage a fluid seal that prevents flow through the housing.

In another aspect of the invention, a method for replacing an air filter is provided. In one embodiment, the method includes the steps of sealing an inlet to a filter housing, retaining a replaceable air filter, removing the air filter, replacing the air filter with a replacement, installing a replacement air filter and opening the seal to allow air flow through the filter.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and, therefore, are not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
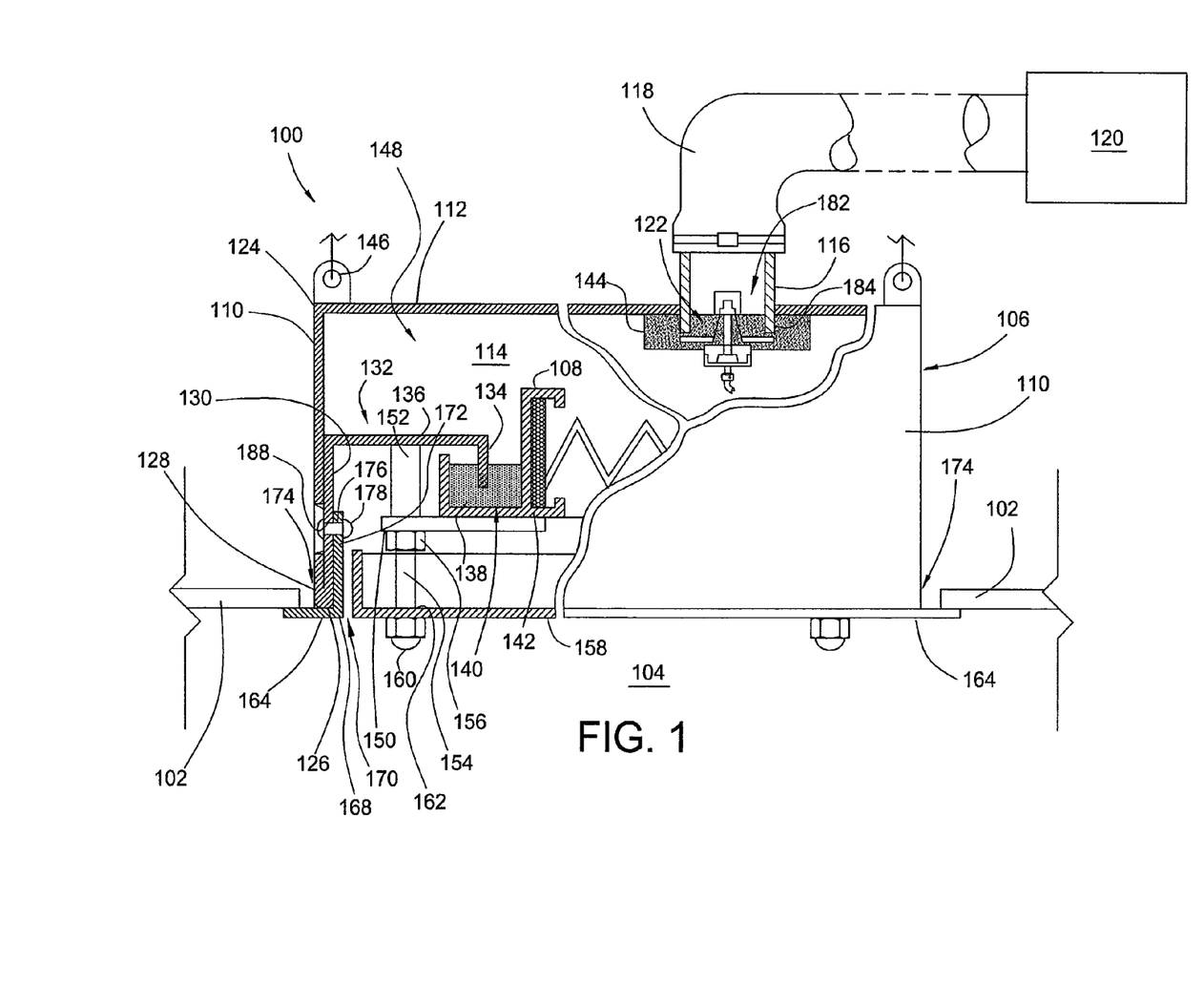
FIG. 1 depicts a simplified, partial sectional view of one embodiment of a filter module having a damper assembly.

FIG. 1 depicts a sectional view of one embodiment of a filter module 100 disposed in a ceiling 102 of a cleanroom 104. The filter module 100 includes a damper assembly 122 configured to selectively prevent flow through the filter module 100 with a bubble-tight seal. Typically, additional filter modules 100 (not shown) are utilized in predetermined positions within the cleanroom 104 to provide predetermined levels of cleanliness and ventilation. The scale of FIG. 1 has been altered to allow details of the module 100 to be clearly shown in a single view.

The filter module 100 generally includes filter housing assembly 106 that retains a removable filter 108. The filter housing assembly 106 includes a filter housing 180 and a collar 116. The collar 116 may be an integral part of the housing 180 or separately coupled thereto, and facilitates coupling the filter housing assembly 106 to a duct 118 that supplies air from an air handler 120. The air handler 120 supplies air to the filter module 100. The air handler 120 includes one or more blowers or fans (not shown) and may additionally include pre-filtration elements such as ASHRAE or HEPA filters. It is also contemplated that the collar 116 may be coupled to an air return to exhaust the room throughout the filter 108.

The housing 180 has a plurality of sidewalls 110 and a backplate 112 that define an interior volume 114. It is contemplated that cylindrical housings may utilize a single sidewall 110. The sidewalls 110 and backplate 112 may be fabricated from a single element of materials, or may comprise separate components, sealingly coupled together.

The sidewalls 110 and backplate 112 of the housing assembly 106 are generally fabricated from metals, such as aluminum or stainless steel, or other materials such as plastic, or glass reinforced plastic, among others. The sidewalls 110 are generally configured in a polygonal form, typically square or rectangular. The sidewalls 110 are sealingly coupled together at their intersections, for example, by welding, riveting, soldering, adhering, bonding, caulking and the like. The backplate 112 is generally coupled to the sidewalls 110 in a similar fashion to make the housing assembly 106 leak-tight.

The back plate 112 includes an inlet 182 formed therethrough. The inlet 182 is circumscribed by the collar 116 and facilitates airflow into the interior volume 114 of the housing assembly 106. The collar 116 is typically cylindrical, but may alternatively be square, rectangular or have another shape. An optional lip 184 may extend into the interior volume 114 from the backplate 112 and circumscribes the inlet 182. The lip 184 is sealingly coupled to the backplate 112, for example, by welding or caulking. The lip 184 may be sealed to the backplate 112 by other methods. The lip 184 may alternatively be drawn, spun or otherwise formed from the backplate 112. In another embodiment, the lip 184 may be part of the collar 116. The lip 184 may be utilized to enhance the sealing attributes of the damper assembly 122 as discussed further below.

Each sidewall 110 includes a first end 124 coupled to the backplate 112 and a second end 126 that interfaces with the cleanroom ceiling 102. The first end 124 of the sidewall 110 and/or backplate 112 generally includes a mounting pad or tab 146 that facilitates coupling the housing 106 to a supporting structure (not shown) above the cleanroom 104. The second end 126 defines an opening that accepts the filter 108 into the housing assembly 106.

The sidewalls 110 have a double wall that includes an outer section 128 disposed against at least a portion of an inner section 130. In the embodiment depicted in FIG. 1, the outer section 128 is disposed between the first end 124 and the second end 126 while the inner section 130 extends from the second end 126 along a portion of the outer section 128 to a sealing section 132. The outer and inner sections 128, 130 are sealingly joined at the second end 126, and in one embodiment, are fabricated from a continuous piece or sheet of material where the outer section 128 is folded at the second end 126 and transitions into the inner section 130.

In one embodiment, the sealing section 132 includes a knife edge 134 that is coupled to the inner section 130 by a flange 136. Typically, the knife edge 134 and flange 136 are fabricated from a single piece of material, and may also be fabricated with the inner section 130 of the sidewall 110 as a continuous piece of material. The knife edge 134 is orientated substantially parallel to the sidewalls 110 and is configured to interface with a sealing element 138 disposed at one end the filter 108 to create an air-tight seal between the filter housing assembly 106 and the filter 108. Thus, the sealing section 132 separates the interior volume 114 of the housing assembly 106 into a plenum 148 upstream of the filter 108 and a downstream or roomside. In other words, the filter 108 interfacing with the sealing section 132 separates the unfiltered air upstream of the filter 108 with the clean, filtered air, downstream of the filter 108 that enters the cleanroom 104.

In the embodiment depicted in FIG. 1, the sealing element 138 is a silicon or polyurethane gel disposed in a trough 140 formed in a frame 142 of the filter 108. The knife edge 134 penetrates the gel to create an air seal between the filter 108 and housing assembly 106. Filter performance (i.e., efficiency, pressure drop) is generally selected based on filtering and resistance criteria needed for a particular application to be performed in the cleanroom 104. Filters manufactured for this use are commercially available, e.g., from CAMFIL FARR, INC. located in Riverdale, N.J.

Figure 2:
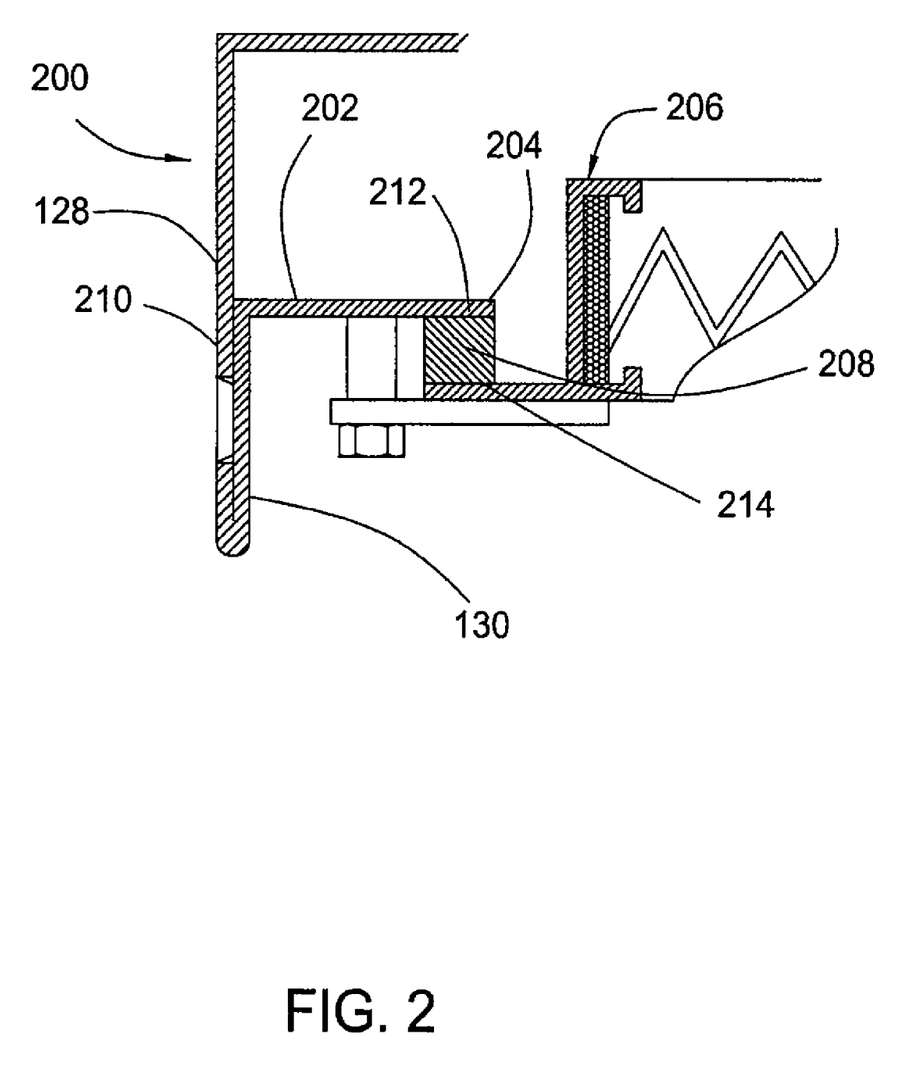
FIG. 2 is an alternative embodiment of a sealing section of a filter housing.

FIG. 2 depicts another embodiment of a housing 200 having an alternative sealing section 202. Sidewalls 210 of the housing 200 are generally similar to the sidewalls 110 described above with reference to FIG. 1. The sealing section 202 includes a flange 204 that extends perpendicularly inward from the inner section 130 of the sidewall 210 to provide a planar seating surface 212. A filter 206 having a gasket 208 disposed on top of a portion of a filter frame 214 is urged against the flange 204, thereby compressing the gasket 208 against the flange 204 to provide a seal between the housing 200 and filter 206. It is contemplated that the gasket 208 may be alternatively coupled to the flange 204 of the housing 200.

Returning to FIG. 1, the filter 108 is secured to the housing 106 by a pawl tab 150 mounted on a standoff 152 coupled to the flange 136. The pawl tab 150 may be rotated about a stud 154 extending from the standoff 152 to provide clearance for removing/replacing the filter 108. Once the filter 108 is inserted into the housing assembly 106, the pawl tab 150 is rotated to capture the filter 108 against the flange 136 (as shown). A locking nut 156 threaded on the stud 154 secures the pawl tab 150 in position.

The stud 154 may optionally extend to about the second end 126 of the sidewalls 110 to facilitate coupling a perforated or expanded screen 158 across the open end of the housing assembly 106. The screen 158 has a plurality of mounting holes 162 configured to accept the studs 154. An acorn nut 160 or other fastener is coupled to the stud 154 to secure the screen 158 to the housing assembly 106.

A trim ring 164 is disposed between the screen 158 and the housing assembly 106 to cover the interface of the housing assembly 106 and ceiling 102 of the cleanroom 104. Caulk, or other sealant (not shown) may be applied between the trim ring 164 and ceiling 102 to prevent leakage between the cleanroom and an unfiltered area 166 above the ceiling 102. In most applications, the pressure in the cleanroom 104 is greater than the pressure in the area 166 to prevent leakage from the area 166 into the cleanroom 104.

The trim ring 164 is generally comprised of stainless steel, aluminum or other rigid material. The trim ring 164 is comprised of a picture frame 168 defining an aperture 170 and having a flange 172 extending into the aperture 170 substantially perpendicular to the picture frame 168. In the embodiment depicted in FIG. 1, the picture frame 168 is rectangular. The picture frame 168 is configured to extend from an inner surface of the inner section 130 of the sidewall 110 to cover a hole 174 in the ceiling 102 in which the housing assembly 106 is mounted.

The flange 172 is disposed against the inner surface of the sidewalls 110 when the trim ring 164 is mounted to the housing assembly 106. The flange 172 includes a plurality of mounting holes 176 formed therein to facilitate coupling the trim ring 164 to the housing assembly 106. A fastener 178, such as a rivet, self-tapping screw or other device is disposed through the mounting hole 176 of the trim ring 164 and into the sidewall 110 to secure the trim ring 164. A mounting hole 188 for the fastener 178 is typically formed through the inner section 130 of the sidewall 110 at installation by drilling or use of a self-tapping screw.

The housing assembly 106 may include an optional diffuser plate 144 coupled to the housing 180 and extending into the interior volume 114 of the housing assembly 106. The diffuser plate 144 is typically configured to uniformly distribute air entering through the inlet 182 into the housing 180, such that a uniform airflow distribution through the filter 108 is realized. Generally, the diffuser plate 144 is positioned, sized and shaped to provide uniform aerosol and airflow uniformity for a predefined housing geometry. The diffuser plate 144 may be fabricated from a metal or plastic material, and may be slotted, perforated or expanded to allow at least some air flow therethrough.

The damper assembly 122 is mounted to the housing 180 and controls the flow of air into the interior volume 114. In the embodiment depicted in FIG. 1, the damper assembly 122 is coupled to the backplate 112. Alternatively, the damper assembly 122 maybe coupled to the sidewalls 110 or the collar 116. The damper assembly 122 may be closed to substantially stop the air flowing into the housing assembly 106 during replacement of the filter 108. The damper assembly 122 may also be incrementally opened to balance the air flowing into the cleanroom 104 between other filters (not shown) providing air to the cleanroom 104.

Figure 3:
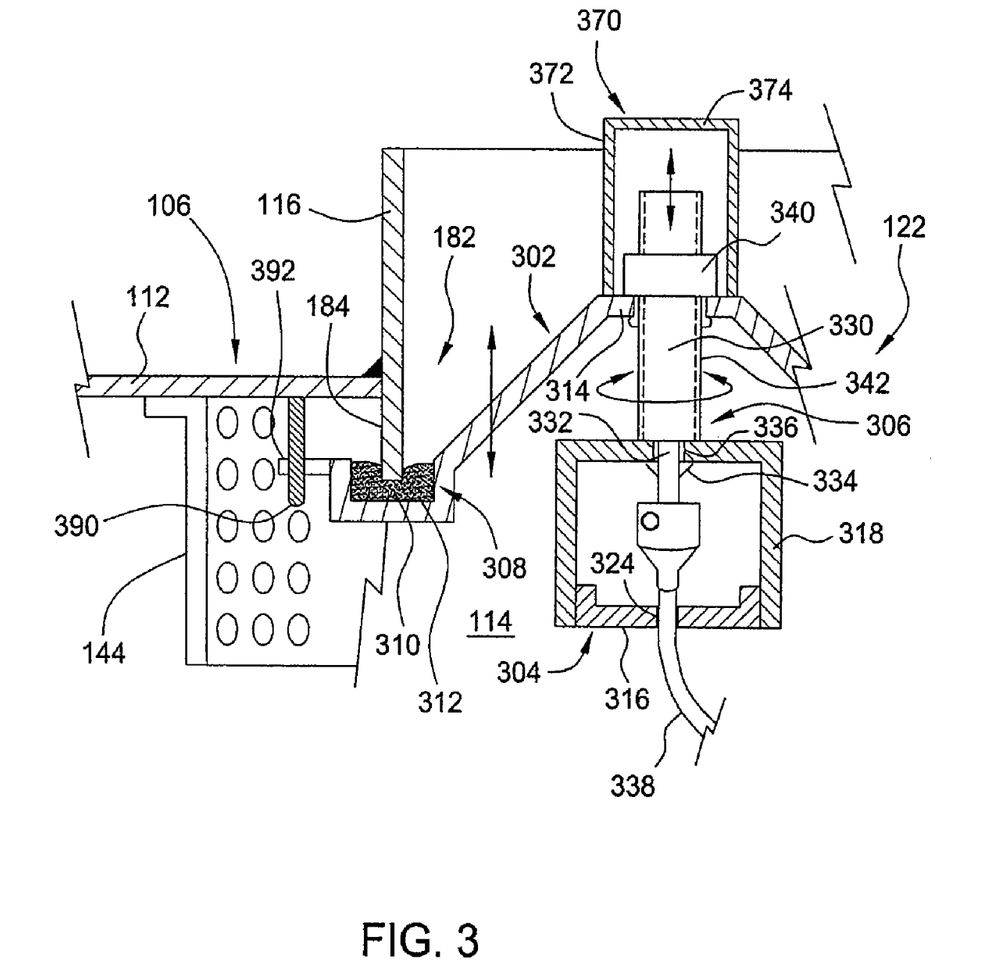
FIG. 3 is a partial sectional view of one embodiment of a damper assembly coupled to a housing assembly.

FIG. 3 is a partial sectional view of the housing assembly 106 illustrating the damper assembly 122. The damper assembly 122 includes a seal member 302 coupled to support member 304 by an adjustment mechanism 306. A sealing element 310 is disposed between the housing assembly 106 and seal member 302. The adjustment mechanism 306 is adapted to move the seal member 302 between a first position that allows air (or other gas) into the internal volume 114 of the housing assembly 106 and a second position that prevents flow through the inlet 182 of the housing assembly 106. Accordingly, the adjustment mechanism 306 may be utilized to selectively control the spacing between the housing assembly 106 and the seal member 302, thereby controlling the flow of air through the inlet 182 and ultimately through the filter 108.

The seal member 302 is fabricated from a material non-permeable to air at pressure differentials typically encountered in ventilation systems. Materials suitable for fabricating the seal member include metals, such as aluminum or stainless steel, or other materials such as plastic, or glass reinforced plastic, among others. The seal member 302 is generally configured with a plan area larger than the diameter of the inlet 182. The seal member 302 may have polygonal, disk or other plan form.

The horizontal sectional profile of the seal member 302 may vary to provide a predetermined distribution of air flow and/or pressure within the internal volume 114 of the housing assembly 106. The seal member 302 may have a flat, conical, dome, bowl, convex, concave, spherical or other sectional shape. In the embodiment depicted in FIG. 3, the seal member 302 has a truncated cone shape.

The seal member 302 generally includes an outer portion 308 and a center portion 314. The outer portion 308 supports the sealing element 310 on a side of the seal member 302 facing the inlet 182. In the embodiment depicted in FIG. 3, a channel 312 is formed in the outer portion 308 of the seal member 302 to position the sealing element 310 in a predefined position relative to the inlet 182. For example, the channel 312 is substantially centered relative to the lip 184 that extends into the internal volume 114 of the housing assembly 106 so that the force per unit area of the lip 184 against the sealing element 310 ensures a bubble-tight seal of the inlet 182, thereby preventing flow into the housing assembly 106.

The sealing element 310 may be any material suitable for providing a bubble-tight seal between the seal member 302 and housing assembly 106. Examples of suitable sealing elements 310 include gaskets, gels and bladders, among others. Examples of suitable gasket materials include neoprene, foamed urethane, silicone, butyl, viton and the like. Examples of suitable gel materials include polymeric gel, polymeric thermoset gel, polymeric thermoplastic elastomer gel, silicon gel, polyurethane gel, and the like. In the embodiment depicted in FIG. 3, the sealing element is a polyurethane gel that allows penetration of the lip 184, thereby ensuring a bubble-tight seal.

Figure 4A:
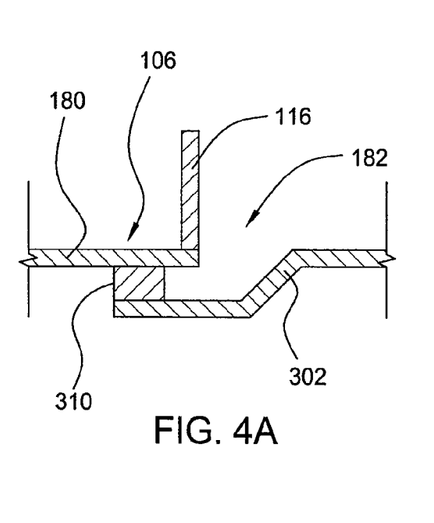
FIG. 4A-E are various embodiments of a sealing element disposed between a housing assembly and a seal member.
Figure 4B:
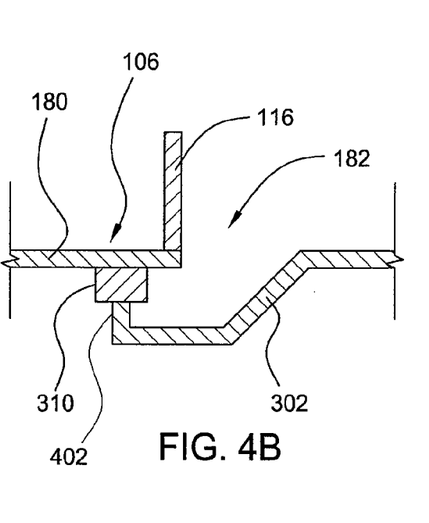
Figure 4C:
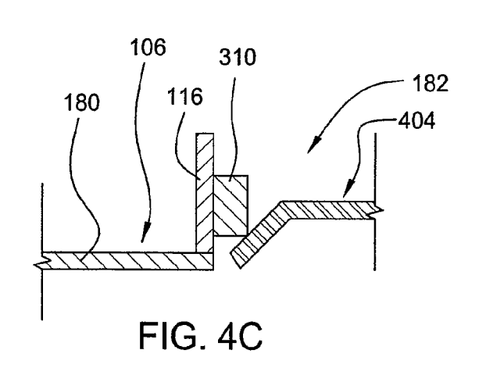
Figure 4D:
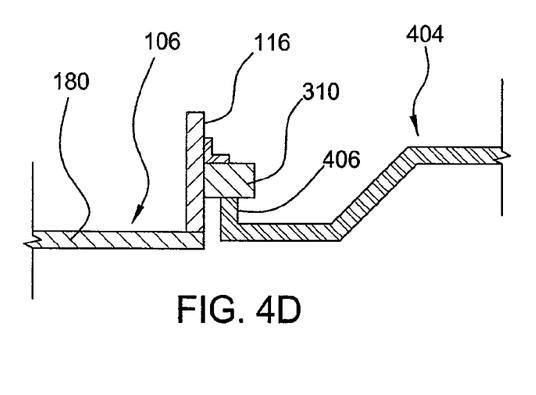
Figure 4E:
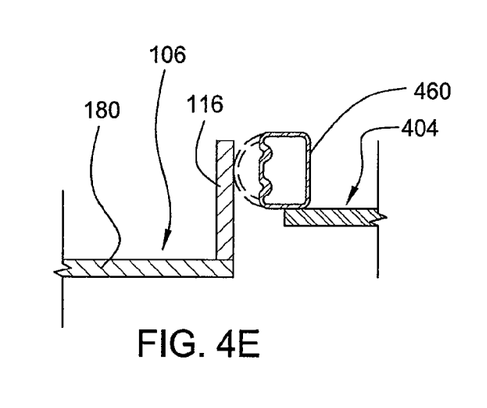

It is contemplated that the sealing element 310 may be sealingly engaged by the housing assembly 106 and seal member 302 in other configurations. For example, the sealing element 310 may be coupled to at least one of the housing assembly 106 and seal member 302, and provide a bubble-tight seal without engaging a lip, as shown in FIG. 4A. In another example, the sealing element 310 may be coupled to the housing assembly 106 and engaged by a lip 402 extending from seal member 302, as shown in FIG. 4B. In yet another example, the sealing element 310 may be coupled to the housing assembly 106 within the collar 116 and engaged by a seal member configured with a diameter less than the inlet 182, as shown in FIG. 4C. In still another example, the sealing element 310 may be engaged by a lip 406 extending from seal member 404, as shown in FIG. 4D. In another embodiment, the sealing member 404 may be coupled to the housing assembly 106 within the collar 116 and of a diameter less than the inside diameter of the collar 116. An inflatable gasket or bladder 460, coupled to at least one of the seal member 404 or collar 116, may be inflated and urged between the inside of the collar 116 and the seal member 404 to provide a bubble-tight seal, as shown in FIG. 4E.

The bubble-tight seal prevents air borne particles and contaminants from entering the cleanroom. The bubble-tight seal may be tested using pressure decay techniques, for example, as described in ASME N509-1989, Paragraph 5.9.7.3, which states that the damper seal shall be bubble tight when tested in the closed position at 10 inches water gage. Alternative seal criteria may include testing the bubble tight seal at a pressure between about 3 to 15 inches water gage. It is contemplated that alternative seal test criteria may be utilized.

Referring back to FIG. 3, the support member 304 includes a cross bar 316 and a mounting plate 318. The cross bar 316 is coupled to opposite sidewalls 110 of the housing 180. The mounting plate 318 is coupled to the center of the cross bar 316 and provides an anchor for the adjustment mechanism 306. In the embodiment depicted in FIG. 3, both the cross bar 316 and the mounting plate 318 have a "U" shaped cross section to limit deflection.

Figure 5:
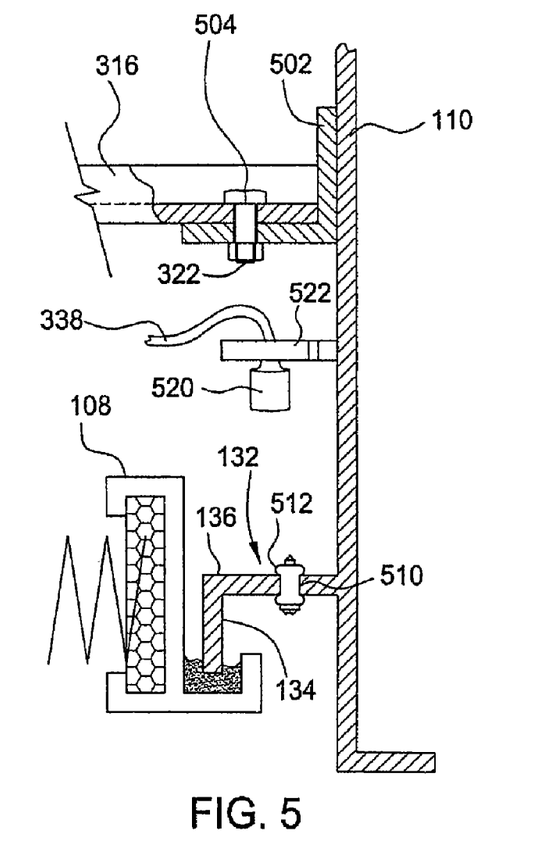
FIG. 5 is partial sectional view of the housing of FIG. 3.

Referring additionally to FIG. 5, the end of the cross bar 316 is coupled to a tab 502 that extends into the housing 180 from the sidewall 110. The opposite end of the cross bar 316 (not shown) is similarly attached to the opposite sidewall 110. The tab 502 may be coupled to the sidewall 110 by any method that does not generate a leak path into (or out on the housing 180. In the embodiment depicted in FIG. 5, the tab 502 is welded to the housing 180. The cross bar 316 may be coupled to the tab 502 by any suitable method, such as welding, riveting fastening and the like. In the embodiment depicted in FIG. 5, the tab 502 is coupled to the cross bar 316 by a fastener 504, such as a machine screw and locknut, or rivet. Alternatively, the cross bar 316 may be coupled directly to the sidewall 110 and/or backplate 112 by any method that does not generate a leak path into (or out on the housing 180.

The adjustment mechanism 306 is generally suitable to control the spacing between the seal member 302 and the inlet 182. Suitable adjustment mechanisms 306 include lead screws, ball screws, acme screws, linear actuators, electric motors, fluid cylinders, and mechanical linkages among others. In one embodiment, the adjustment mechanism 306 includes a lead screw 330, a drive nut 340 and a rotary cable 338. The rotary cable 338 is coupled to a shaft 332 extending from the lead screw 330 opposite the drive nut 340 and is utilized to rotate the lead screw 330, thereby controlling the position of the drive nut 340 along the lead screw 330.

The lead screw 330 is axially retained by and may rotate relative to the support member 304. In the embodiment depicted in FIG. 3, the shaft 332 of the lead screw 330 is disposed through a hole 336 formed in the top of the mounting plate 318. A threaded portion 342 of the lead screw 330 which engages the drive nut 340 has a larger diameter than the hole 336, thereby preventing the lead screw 330 from sliding through the hole 336 of the mounting plate 318. A retaining ring 334 may be disposed on the shaft 332 to capture the lead screw 330 to the mounting plate 318, thereby allowing the shaft 330 to rotate freely within the hole 336 without becoming disengaged from the support member 304.

The rotary cable 338 is coupled to the shaft 332 and is routed to the sidewall 110. As depicted in FIG. 5, the rotary cable 338 has an end 520 retained proximate the sidewall 110 by a strap 522. The end 520 is adapted to mate with a driver (i.e., a screw driver, nut driver, hex driver and the like, not shown) disposed through a port 510 formed in the flange 136 of the housing 180 to facilitate adjustment of the seal member 302. The port 510 is typically sealed by a plug 512 when adjustment of the damper assembly 122 is complete. The port 510, or some other similar port, may also be utilized to inject an aerosol challenge or decontamination agents into the interior volume 114 without removal of the filter 108.

Figure 6:
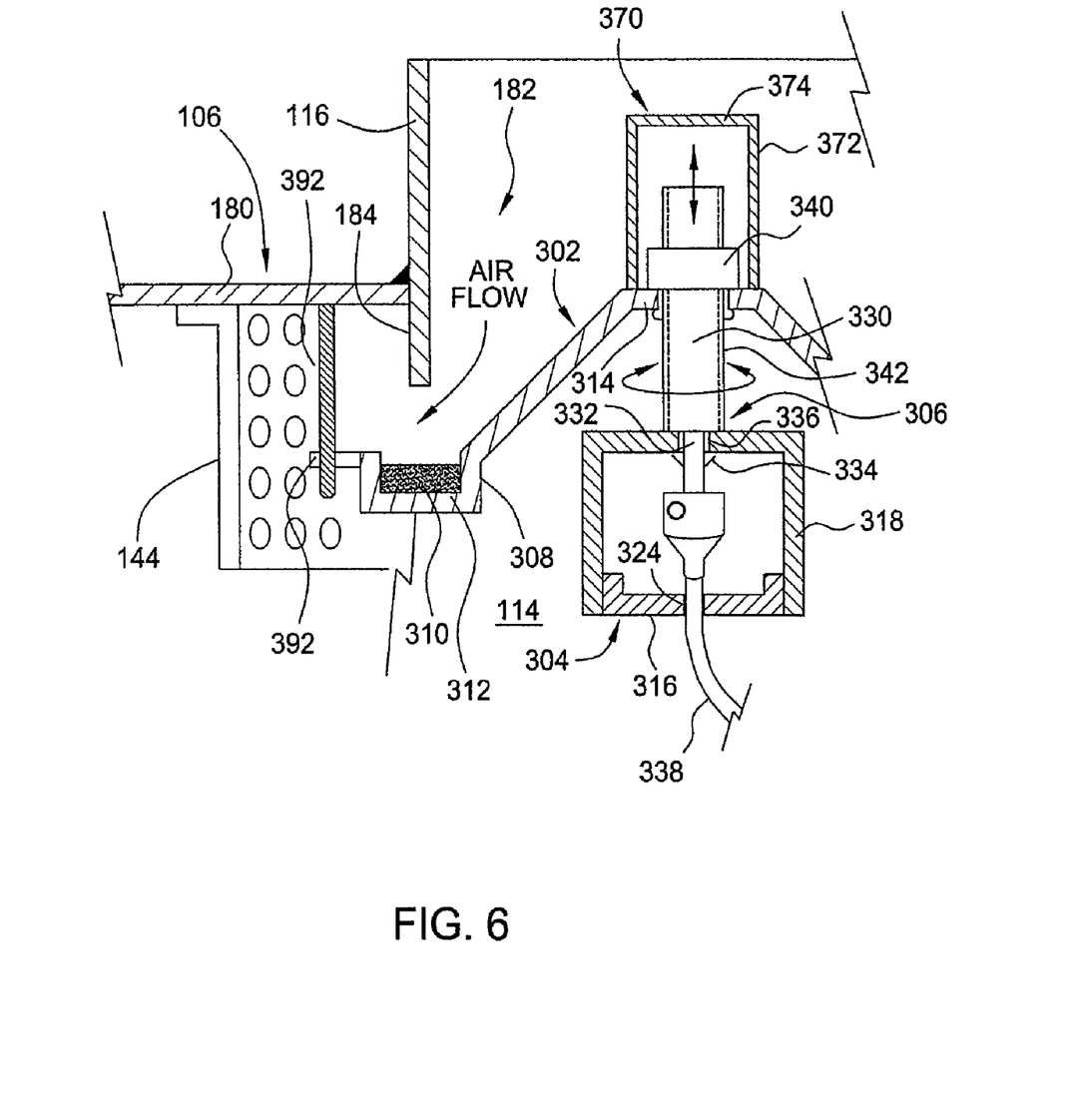
FIG. 6 is a partial sectional view of the damper assembly of FIG. 3 in an open position.

The drive nut 340 is coupled to the seal member 302 and is engaged by the lead screw 330. The drive nut 340 is coupled to the center portion 314 of the seal member 302. The drive nut 340 may be a weld nut, clinch nut, press nut or hole threaded into the seal member 302. The rotation of the seal member 302 is prevented by at least one pin 390 extending from the housing assembly 106 and engaging a hole or slot 392 formed in the seal member 302 radially outward of the sealing element 310. It is contemplated that the seal member 302 may be restrained from rotation by a tab or other geometry configured to engage the support member 304 in a manner that prevents rotation of the disk as the lead screw 330 is rotated. It is also contemplated that the seal member 302 may be restrained from rotation by anti-rotation geometry incorporated into the drive nut 340 and the lead screw 330. Thus, as the lead screw 330 is rotated, the restrained seal member 302 is moved between a second position sealing the inlet 182 (as shown in FIG. 3) and a first position spacing the sealing member 310 from the housing assembly 106 (as shown in FIG. 6), thereby allowing flow through the inlet 182 and into the interior volume 114 of the housing assembly 106.

To prevent leakage into the housing assembly 106 between the drive nut 340 and the lead screw 330, a cover 370 is sealingly coupled to the seal member 302 opposite the cross bar 316. The cover 370 generally prevents air from passing through the interface between adjustment mechanism 306 and the seal member 302 while allowing adequate movement of the lead screw 330.

In the embodiment depicted in FIG. 3, the cover 370 is a cylinder 372 having a first end sealingly coupled to the seal member 302 and a second end sealed by a cap 374. The cylinder 372 has a predetermined length that allows the lead screw 330 to extend into the cylinder 372 to a depth unimpeded by the cap 374 to allow sufficient travel of the drive nut 340 along lead screw 330 in order to provide a predefined flow through the gap created between the seal member 302 and the housing assembly 106.

Figure 7:
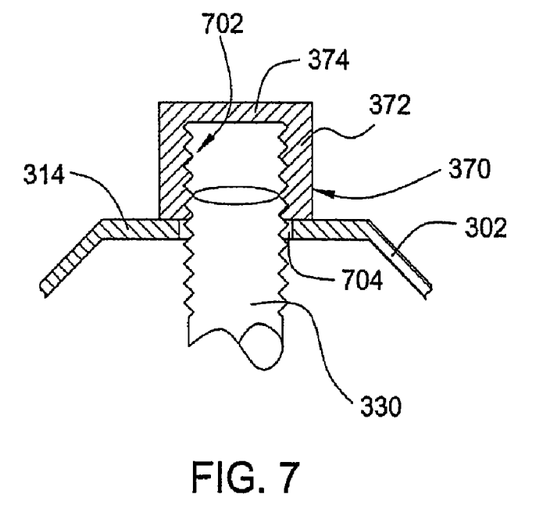
FIG. 7 depicts an alternative embodiment of a seal member and an adjustment mechanism.

Optionally, as shown in FIG. 7, the cylinder 372 may have a threaded interior 702 that engages the threaded portion 342 of the lead screw 330, thereby eliminating the need for a separate drive nut. In this embodiment, a clearance hole 704 is provided for the lead screw 330 in the center portion 314 of the seal member 302.

Figure 8:
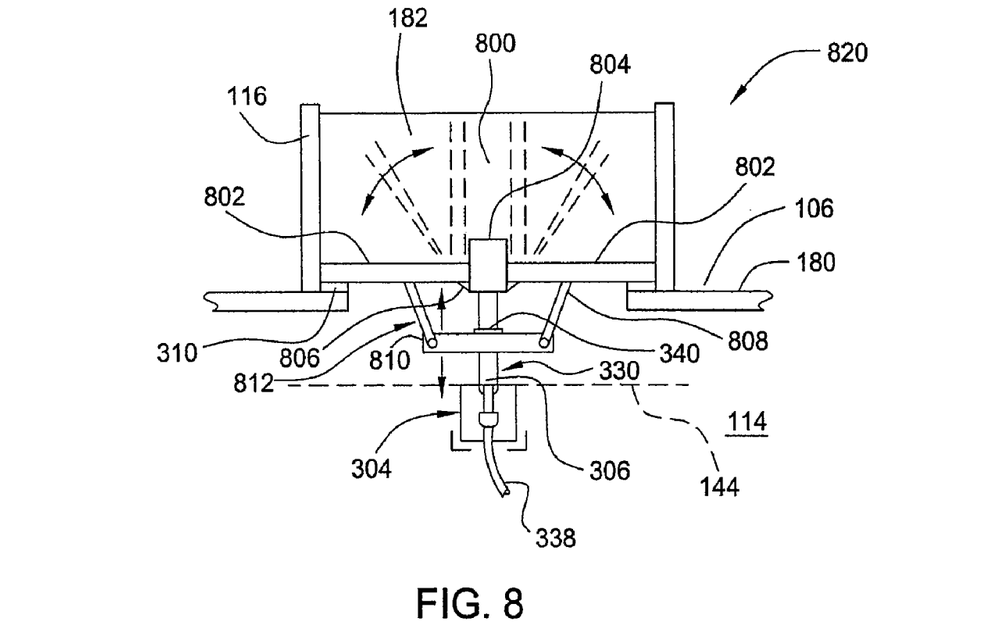
FIG. 8 depicts a sectional view of one embodiment of a butterfly damper.

FIG. 8 depicts another embodiment of a filter module 820. The filter module 820 is substantially similar to the filter modules described herein, except wherein a damper assembly 800 has a butterfly configuration. The damper assembly 800 includes a cross member 804 having two vanes 802 coupled thereto. The vanes 802 are configured to rotate relative to the cross member 804 between a closed position (as shown in FIG. 8) and an open position (shown in phantom in FIG. 8), thereby controlling the flow through the inlet 182 and into the internal volume 114 of the housing assembly 106.

The outer edges of the vanes 802 make sealing contact with the seal element 310 that is coupled to the housing 180 when the vanes 802 are in the closed position. The inner edges of the vanes 802 adjacent the cross member 804 are coupled to the cross member 804 by a flexible gasket 806. In one embodiment, the flexible gasket 806 may be an inflatable gasket. The flexible gasket 806 prevents air from leaking between the cross member 804 and vanes 802, while allowing the vanes 802 to move relative to the cross member 804. The cross member 804 is generally coupled to the collar 116 in a manner similar to the coupling of the support member 304 to the side walls 110 as described above. In another embodiment, the seal element 310 may be coupled to the vanes 802 and make sealing contact with the housing 180 when the vanes 802 are in the closed position.

A linkage 812 couples the vanes 802 to the adjustment mechanism 306. The linkage 812 includes a slider 810 and a pair of arms 808. The arms are pivotably coupled at opposite end to the slider 810 and the vanes 802. A drive nut 340 is coupled to the slider 810, and upon rotation of the lead screw 330, causes the slider 810 to move along the lead screw 330, thereby actuating the vanes 802 between the open and closed position.

An optional diffuser plate 144 (shown in phantom) may be coupled to the support member 304 or housing assembly 106 to direct the air entering the housing assembly 106 and uniformly distribute the air entering the housing assembly 106 through the inlet 182. In the embodiment depicted in FIG. 8, the diffuser plate 144 is a perforated disk coupled to the support member 804.

Figure 9:
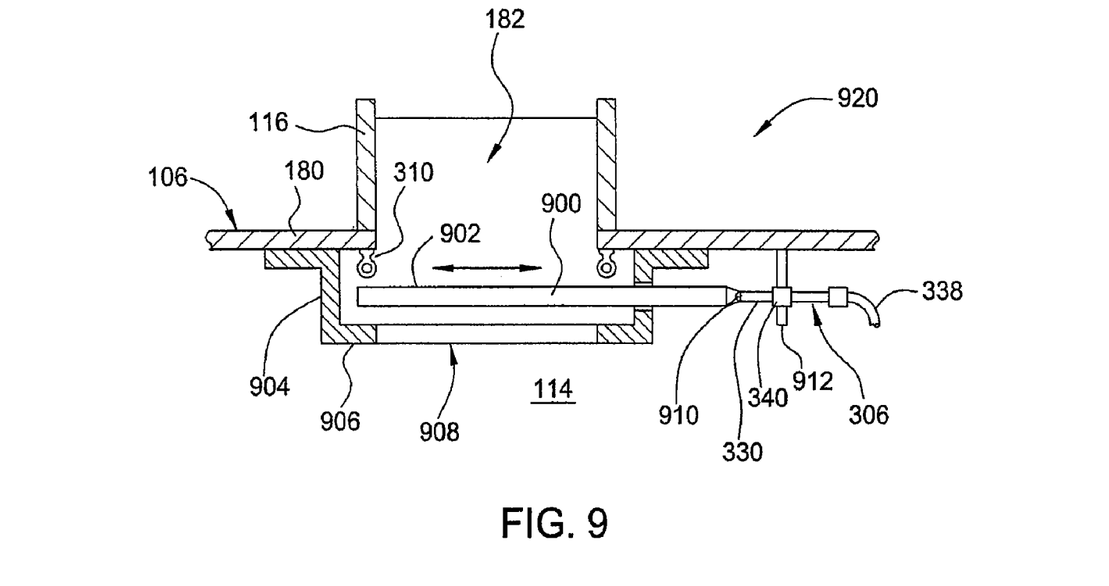
FIG. 9 depicts a sectional view of one embodiment of a guillotine damper.

FIG. 9 depicts another embodiment of a filter module 920. The filter module 920 is substantially similar to the filter modules described herein, except wherein a damper assembly 900 is in the form of a guillotine.

The damper assembly 900 includes a vane 902 slidably disposed in a bracket 904 that is coupled to the housing 180. The bracket 904 includes a flange 906 which retains the vane 902 in a predefined spacing relative to the housing 180. The bracket 904 includes an aperture 908 that allows air into the internal volume 114 of the housing assembly 106 when the vane 902 is moved clear of the inlet 182.

A tab 912, coupled to the housing 180, retains a drive nut 340 of the adjustment mechanism 306. The lead screw 330 is disposed through the drive nut 340 and coupled at one end to the vane 902 by a universal fitting 910. The fitting 910 allows the lead screw 330 to rotate without decoupling from the vane 902. As the rotary cable 338 is rotated, the lead screw 330 advances through the drive nut 340, thereby positioning the vane 902 relative to the inlet 182. It is contemplated that the adjustment mechanism may be a mechanical linkage, a linear actuator, pneumatic cylinder, gear motor, and the like.

The seal element 310 is coupled to the bottom side of the housing 180 opposite the flange 906. In the embodiment depicted in FIG. 9, the seal element 310 is an inflatable seal or bladder circumscribing the inlet 182, which may be inflated to urge against the vane 902 when the vane 902 is in a position closing the inlet 182, as shown in FIG. 9. It is contemplated that the seal element 310 may be selectively urged against the vane 902 to create a bubble-tight seal between the vane 902 and the housing assembly 106 by alternative methods.

Figure 10:
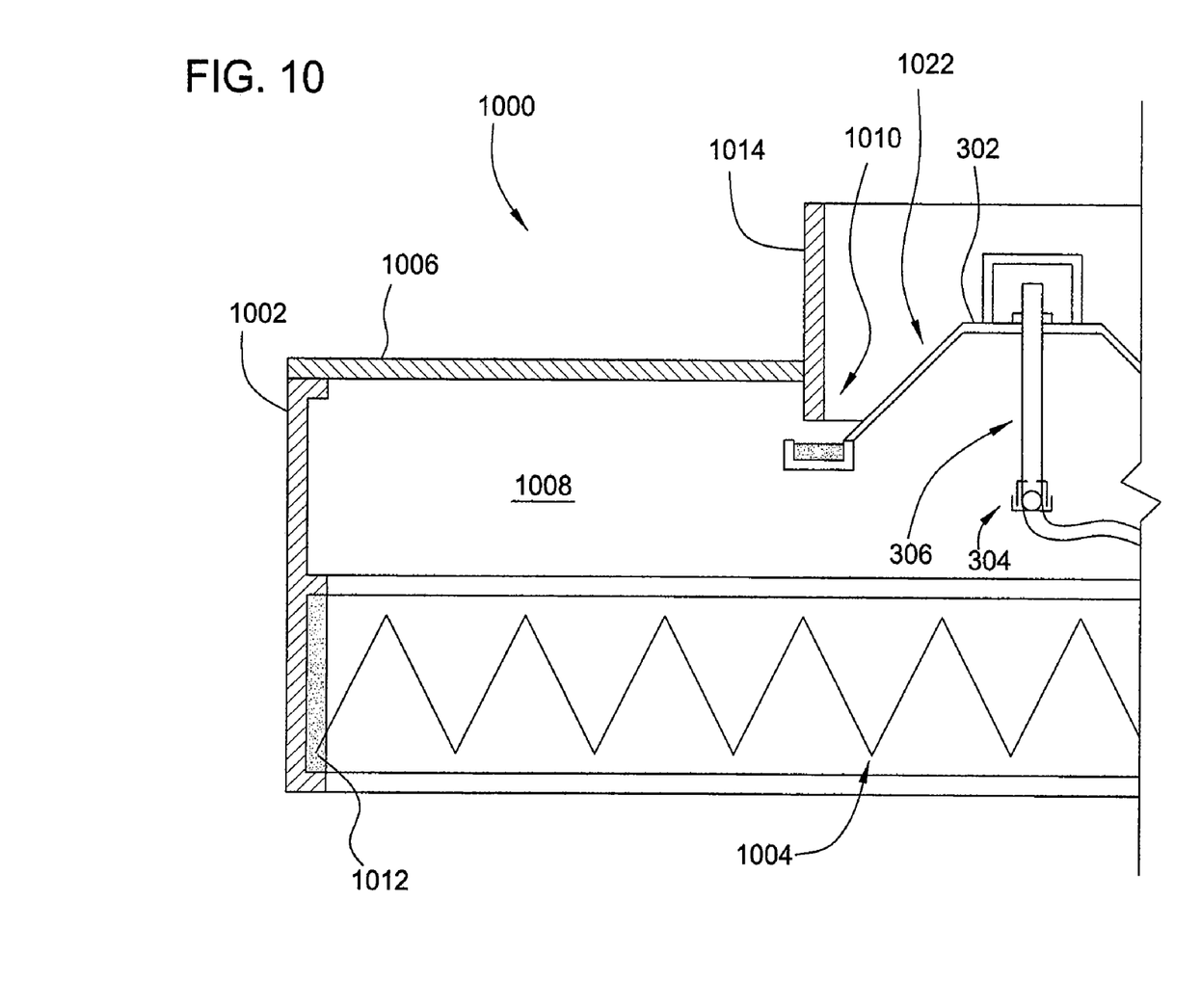
FIG. 10 depicts a sectional view of one embodiment of a diffuser having a damper assembly.

FIG. 10 depicts a filter module 1000 having a damper assembly 1022 suitable for providing a bubble-tight seal. The filter modules, also known in this configuration as diffusers, which may be adapted to benefit from the invention are generally available from Camfil Farr, Inc., located in Riverdale, N.J.

The filter module 1000 generally includes a frame 1002 having a filter element 1004 permanently coupled thereto. In the embodiment depicted in FIG. 10, the filter element 1004 is bonded to the frame 1002 by a polyurethane adhesive 1012. A backplate 1006 is coupled to the frame 1002. The frame 1002 has a depth sufficient to maintain the back plate 1006 and filter element 1004 in a spaced-apart relationship, thereby defining a plenum 1008 within the filter module 1000. A collar 1014 is coupled to the backplate 1006 and circumscribes an inlet 1010 formed in the backplate 1006. The damper assembly 1022, which may be configured similar to the damper assemblies described above, is coupled to at least one of the backplate 1006, the frame 1002 or the collar 1014, and is generally suitable for providing a bubble-tight seal of the inlet 1010 of the filter module 1000.

Alternatively, the filter module 1000 instead of the filter element 1004, the filter module 1000 may include a perforated material and/or eggcrate grille and/or other materials, etc. and the module coupled thereto. Thus, the filter module 1000 may be configured as a Laminar Flow Module, Laminar Flow Element or Laminar Flow Diffuser. Installing the bubble-tight damper 1022 in this configuration allows the site operator to seal the filter module 1000 prior to "fogging" an entire room or laboratory.

Thus, a filter module is provided that includes a bubble-tight sealing damper assembly. The housing may be configured to accept replaceable or permanently potted filter elements. Although the embodiments depicted above are described for use in cleanroom applications, the housing may be utilized equally effective as a housing for ASHRAE filters, filters of HEPA and higher efficiency, filters of sub-HEPA and low efficiency, carbon absorption products and the like. It is additionally contemplated that the filter housing may be utilized as an air return, wherein the filter is positioned upstream of the damper assembly. The bubble-tight sealing of the damper assembly allows the cleanroom or work area to be advantageously isolated by the filter module, thereby facilitating maintenance of the ventilation system, decontamination of the work area, and the like, to be preformed without exposing the work area to contaminants upstream of the filter module, in the case of supply applications, or downstream of the filter module, in the case of exhaust applications.

The inventive filter module having a bubble-tight damper allows facility owners to isolate individual filters and decontaminate prior to filter removal. This will eliminate exposure of the cleanroom to contaminated plenum and supply ducts. For example, in the case where a supply filter needs to be replaced, the bubble-tight damper of that particular hood or filter module may be sealed and the hood or filter module decontaminated with the filter installed. After the decontamination process, the filter may be removed. Because the plenum and filter are completely isolated from the supply duct upstream of the hood or filter module, and the plenum area decontaminated prior to filter removal, the cleanroom will not be exposed to decontaminated areas. Once the new filter is installed, the bubble-tight damper can be opened, and operation of the cleanroom may resume. Moreover, in situations where a facility owner intends to "fog" a room for decontamination, the filter module with the integral bubble-tight damper will allow the customer to very quickly and easily seal each of the hoods to prevent the fogging agent from entering the air supply system, thereby eliminating the need to seal with plastic or some other material prior to decontamination.

Although various embodiments which incorporate the teachings of the present invention have been shown and described in detail herein, those skilled in the art can readily devise many other varied embodiments that still incorporate these teachings.

What is claimed is:

1. A filter housing assembly comprising:
   a filter housing;
   an air passage defined through the filter housing;
   one or more removable filters disposed in the filter housing and positioned to filter air passing through the air passage;
   a damper disposed in the filter housing and having a fluid seal, the damper configured to selectively close the air passage.

2. The filter housing assembly of claim 1, further comprising an actuator configured to move fluid seal between positions that allow and prevent flow through the air passage.

3. The filter housing assembly of claim 2, further comprising a member that prevents rotation of the damper.

4. The filter housing assembly of claim 1, wherein the damper moves linearly and has a conical profile.

5. The filter housing assembly of claim 1, further comprising a lip configured to selectively engage the fluid seal.

6. The filter housing assembly of claim 5, wherein the lip is integral with the housing.

7. A filter housing assembly comprising:
a housing configured to accommodate a replaceable filter therein; and
a damper disposed in the housing and selectively positionable to engage a fluid seal that prevents flow through the housing.

8. The filter housing assembly of claim 7, wherein the housing further comprises:
a lip extending into the housing and configured to selectively engage the fluid seal.

9. The filter housing assembly of claim 8, further comprising a cylindrical collar integral with the lip.

10. The filter housing assembly of claim 7, wherein the fluid seal is disposed on the damper.

11. The filter housing assembly of claim 7, wherein in the fluid seal is at least one of silicon or polyurethane gel.

12. The filter housing assembly of claim 7, wherein in the damper has a conical profile.

13. A filter housing assembly comprising:
a housing configured to retain a filter therein, and
a conical damper having a fluid seal positionable between a first position that prevents flow through the housing and a second position that allows flow through the housing.

14. The filter housing assembly of claim 13, wherein the damper is restrained from rotating.

15. The filter housing assembly of claim 13, wherein the housing further comprises a lip that selectively engages with the fluid seal.

16. The filter housing assembly of claim 13, wherein the damper moves linearly along a centerline of a collar of the housing.

17. The filter housing assembly of claim 16, further comprising a member that prevents rotation of the damper.

18. The filter housing assembly of claim 13, further comprising an aerosol injection member.

19. The filter housing assembly of claim 13, wherein in the fluid seal is at least one of silicon or polyurethane gel.

20. The filter housing assembly of claim 13, further comprising a filter permanently mounted in the housing.

* * * * *

UNITED STATES PATENT AND TRADEMARK OFFICE
CERTIFICATE OF CORRECTION

PATENT NO. : 7,588,614 B2  Page 1 of 1
APPLICATION NO. : 11/682580
DATED : September 15, 2009
INVENTOR(S) : Morse et al.

It is certified that error appears in the above-identified patent and that said Letters Patent is hereby corrected as shown below:

In column 6, line 48, delete "configured" and insert -- 404 configured --, therefor.

In column 7, line 14, delete "on" and insert -- of) --, therefor.

In column 7, line 23, delete "on" and insert -- of) --, therefor.

Signed and Sealed this

Twenty-second Day of December, 2009

David J. Kappos
*Director of the United States Patent and Trademark Office*